March 8, 1927.  W. D. DEWEND  1,619,857
DISK HARROW
Filed Oct. 16, 1922   3 Sheets-Sheet 3
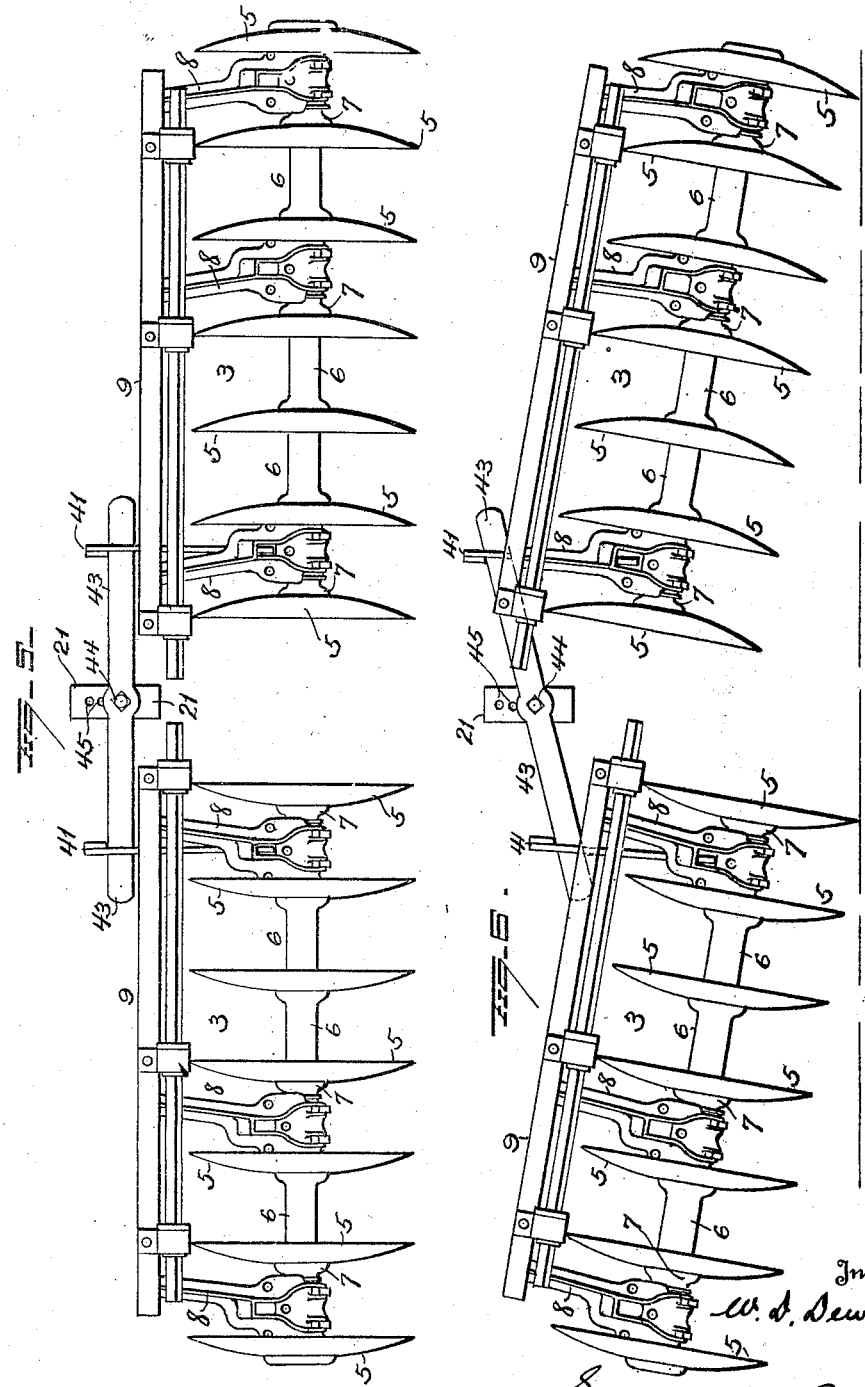

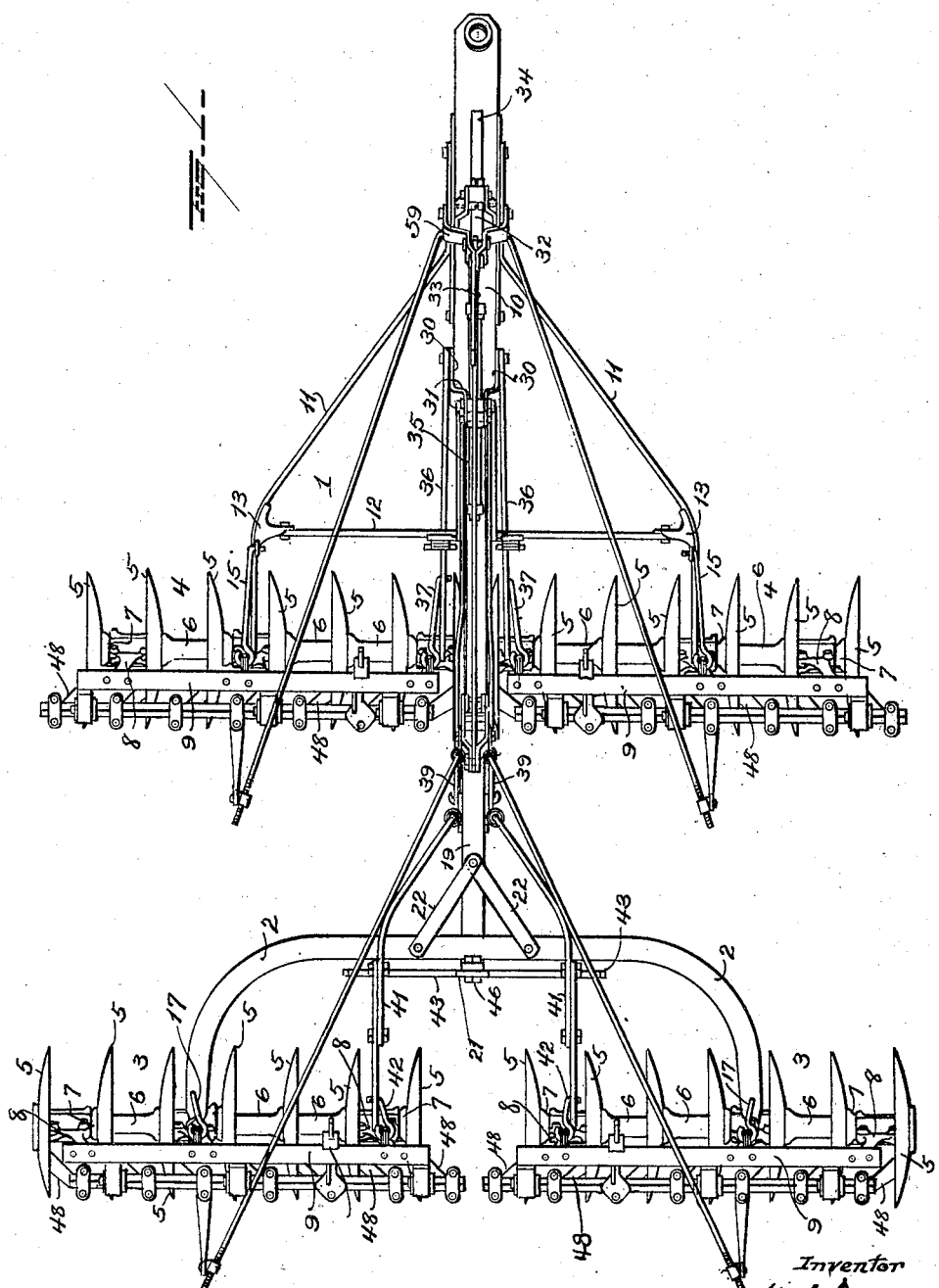

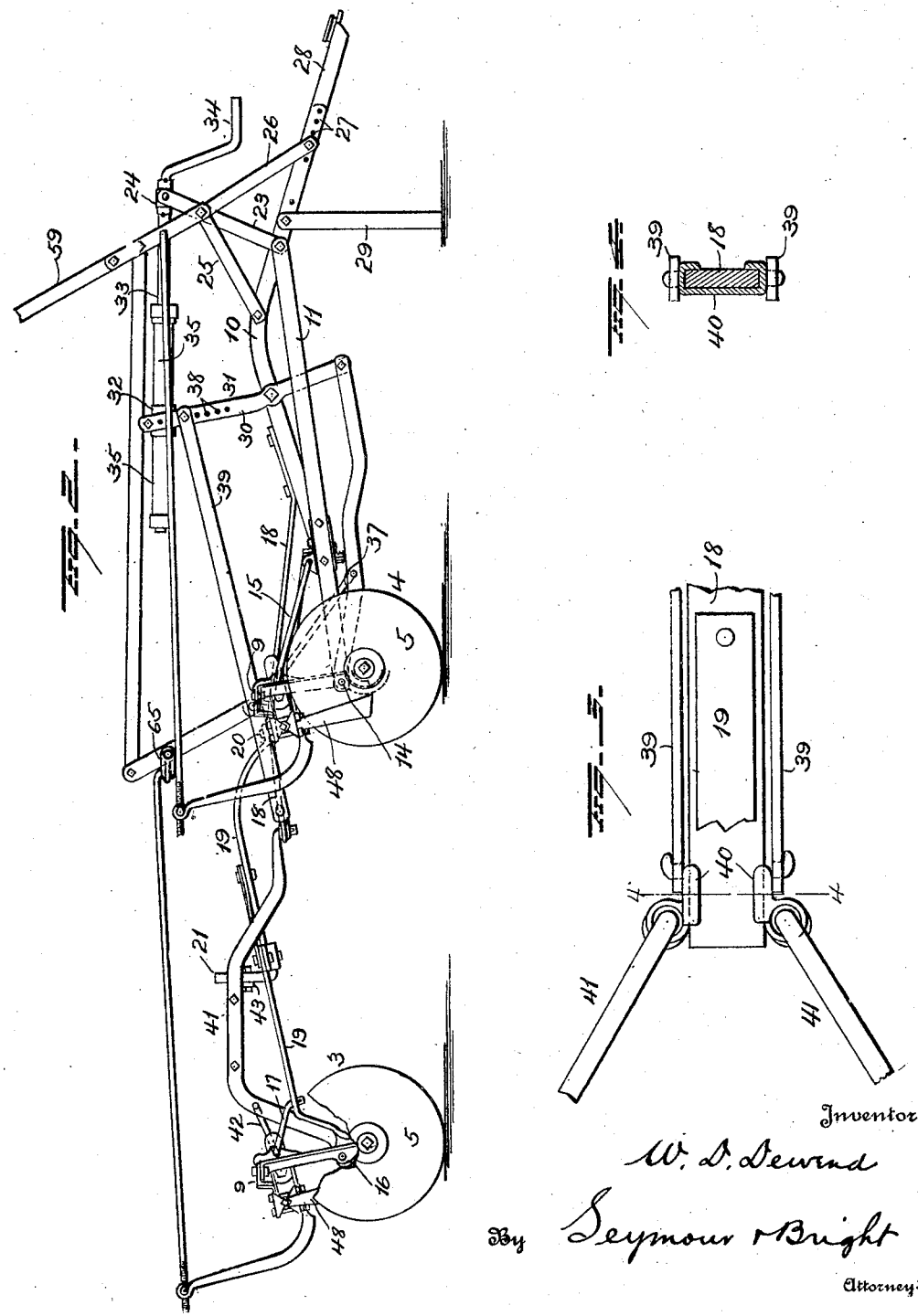

Patented Mar. 8, 1927.

1,619,857

UNITED STATES PATENT OFFICE.

WILLIAM D. DEWEND, OF SOUTH BEND, INDIANA, ASSIGNOR TO OLIVER CHILLED PLOW WORKS, OF SOUTH BEND, INDIANA.

DISK HARROW.

Application filed October 16, 1922. Serial No. 594,888.

This invention relates to improvements in harrows and more particularly to disk harrows of the multiple-gang type in which two disk gangs are arranged in tandem relation to two other disk gangs,—one object of the invention being to provide simple and efficient mechanism whereby all of the gangs may be adjusted or angled simultaneous with the use of a single manually operable device within convenient reach of the operator.

A further object is to so construct angling mechanism for a multiple-gang harrow of the character described, that the front and rear gangs may be set at any desired relative angles and yet caused to assume correct positions transversely of the harrow, with the gangs of the respective pairs in alignment with each other, to facilitate transportation of the harrow, and to cause the gangs to assume such positions simultaneously by the operation of a single manually operable means.

A further object is to provide simple means whereby the depth of penetration of the disks of the rear gangs shall be maintained uniform, and so that adequate flexibility of said gangs shall be insured.

With these and other objects in view, the invention consists in certain novel features of construction and combinations of parts as hereinafter set forth and pointed out in the claims.

In the accompanying drawings; Figure 1 is a plan view of a multiple-gang disk harrow showing an embodiment of my improvements; Figure 2 is a view in side elevation of the same; Figure 3 is an enlarged detail view illustrating part of the connections between the front and rear frames and portions of the angling mechanism for the rear gangs; Figure 4 is a sectional view on the line 4—4 of Figure 3; and Figures 5 and 6 are partial rear views illustrating the construction whereby the flexibility of the rear gang frame is permitted, and whereby the uniformity of depth of penetration of the several disks of the respective gangs may be insured.

My improved harrow embodies two frames 1 and 2, with each of which two disk gang frames are pivotally connected, the rear gang frames 3, 3, being arranged in tandem with the front gang frames 4, 4. Each gang frame comprises a suitable shaft or axle on which a plurality of earth working elements, preferably disks 5, are mounted and spaced apart by sleeves 6 and 7, said shaft or axle being located at the lower ends of standards 8 and the latter are connected at their upper ends by a cross bar 9.

The front frame 1 comprises a draft tongue 10; side bars 11 converging forwardly and secured to the forward portion of the draft tongue 10, and a cross bar 12 extending from one side bar to the other and secured to the same by brackets 13 and to the central portion of said cross bar, the rear end of the draft tongue is secured. Those portions of the frame bars 11 which project rearwardly from the cross bar and its connecting brackets may be parallel with each other and their rear ends are loosely pivoted as at 14 with the lower portions of intermediate standards of the respective front gang frames 4, 4, said frame bars 11 being loosely connected also with the upper portions of said gang frame standards by means of links 15.

The rear frame 2 of the harrow is made approximately U-shaped and its respective ends are loosely pivoted, as at 16, with the lower portions of intermediate standards of the respective rear gang frames, said frame 2 being also loosely connected with the upper portions of said standards by means of links 17.

A bar 18 is rigidly secured to the draft tongue 10 and constitutes a rearward extension of the same. This bar or rearward extension passes between and rearwardly beyond the front gang frames, and to said bar 18, the forward end portion of a rear draft bar 19 is pivotally connected as indicated at 20. The rear draft bar 19 is provided at its rear end with a standard 21 disposed in front of the intermediate portion of the rear frame 2 (for a purpose hereinafter explained) and said draft bar is connected with said frame 2 by means of links 22, 22, as clearly shown in Figure 1.

A standard 23, comprising two members, is secured to the forward portion of the draft tongue 10 and between the upper end portions of the standard members, a sleeve 24 is pivotally mounted for a purpose hereinafter explained. The two-part standard 23 is supported by braces 25, 26, attached to said standard and to the draft tongue 10,—the brace members 26 being adjustably connected with the draft tongue at any of the holes 27 in said tongue. The draft tongue 10 is provided with a tongue extension 28 for connection with a tractor. By adjusting the connection of the forward brace members 26 with the draft tongue, said tongue and its extension may be raised or lowered to accommodate the same to the particular type of tractor with which it may be desired to connect the harrow.

A support 29 may be attached to the forward portion of the draft beam, as shown in Figure 2 whereby the height of the forward harrow frame may be regulated and this device also affords a convenient support when the harrow is uncoupled from the tractor.

The members 30, 30 of a lever 31 are pivotally supported between their ends by the draft tongue 10 and between the upper end portions of their upper arms, a nut 32 is pivotally mounted. A manually operable screw shaft 33 is swivelly mounted in the sleeve 24 carried by the standard 23, and the threaded portion of said shaft passes through and beyond the nut 32 for turning the lever 31 on its fulcrum. The shaft 33 is provided at its forward end with a hand crank 34 within convenient reach of an operator when seated on the tractor with which the harrow may be connected, and the internally threaded sleeve or nut 32 is provided with tubular extensions 35 to contain lubricant and to protect the threaded connection between said shaft and the sleeve or nut.

The lower end portions of the lower arms of the lever members 30 are connected, by rods or pitmen 36 with the inner end portions of the front gang frames, the rear ends of said rods or pitmen being pivoted to the lower portions of the standards of said gang frames and said rods or pitmen are connected with the upper portions of said standards through the medium of links 37, so that when the lever 31 is moved by the screw devices, motion will be imparted to the front gang frames to adjust the angularity of the same relatively to each other. The upper arms of the lever members are provided with series of perforations 38 to permit adjustable connection therewith, of the forward ends of rods or pitmen 39, the rear ends of the latter being loosely connected with a block or member 40 mounted to slide on the bar 18. Arched connecting or pitmen bars 41 (each preferably being made in two parts secured together), are loosely connected at their forward ends with the sliding block 40 at respective sides of the latter as shown in Figures 1 and 3, and the rear end portions of said bars or pitmen 41 are pivotally connected to the lower portions of the inner standards of the respective rear gang frames 3,—said bars or pitmen being also connected with upper portions of said standards, through the medium of links 42.

With the construction and arrangement of parts as above described, it will be readily apparent that when the manually operable screw shaft 33 is turned, the consequent pivoting of the lever 31 on its connection with the draft tongue, will not only cause the shifting or angling of the front gang frames, but that motion will be imparted from the upper arm of said lever, through the rods 39, slide 40 and arch bars or pitmen 41, to the rear gang frames simultaneously to shift or angle the same. The degree of angling of the rear gang frames relatively to that of the front gang frames may be adjusted and regulated by adjusting the connection of the rods or pitmen 39 relatively to the lever 31.

The position of the lever 31 when the gang frame of each pair are in alignment with each other as shown in Figure 1 and the slide block 40 is in its rearward position is determined by the arc through which the rods or pitmen 39 could be moved, the connection of said rods or pitmen with said slide block constituting the axis of such arc. With such construction, the connections of the rods or pitmen with the lever 31 may be adjusted (when the slide is in its rearward position) without effecting any material change in the angle of the rear gangs. The value of this construction will be appreciated when it is noted that regardless of the varied relative angle between the front and rear gang frames when in working position, no further adjustment is necessary to bring the gang frames of the respective pairs into proper alignment (the positions shown in Figure 1) for transportation, as they will always automatically assume proper transverse positions so that the front and rear gang frames will be parallel with each other, when the screw shaft is operated to shift the gang frames from the angled positions to the straight positions shown in Figure 1.

The upturned portion or standard 21 at the rear end of the draft bar 19 affords a mounting for a freely movable rocking bar 43 which latter is pivotally attached centrally between its ends to said standard as indicated at 44,—the end portions of said rocking bar being disposed under the arched connecting pitmen so that the latter will rest upon and be supported by said bar. The general tendency of an in-throw harrow (in this case the arrangements of the disks of the rear gangs) is for the inner disks to cut deeper than the outer disks. This is counteracted in my improved construction by the provision of a freely movable gang-balancing connection afforded by the rocking bar 43 projecting under the arched connecting pitmen 41 so that said bar will hold the inner disks up. As illustrated in Figures 7 and 8, the standard 21 is provided with a series of holes 45 whereby the pivotal connection of the rocking bar 43 with said standard may be adjusted vertically and by such adjustment the depth of penetration of all the disks of each rear gang may be readily adjusted and regulated. Furthermore, the pivotal connection between the bar 19 and the rocking bar permits considerable flexibility of the rear gang frames as evidenced by a comparison of Figures 7 and 8, whereby said gangs are enabled to assume varied alignment one to the other, the better to conform to the irregular contour of the surface of the ground.

When working in dead furrows, ditches and the like, the end portions of the rocking bar may be arranged over instead of under the pitmen 41.

Scrapers 48 are provided for the disks and are operable through suitable connections by a single hand lever 59 as fully described in application for patent filed by me on the 25th day of September, 1923, and designated by Serial No. 664,738.

Various changes might be made in the details of construction of my invention without departing from the spirit of the latter or limiting its scope and hence I do not wish to restrict myself to the precise details herein set forth.

Having fully described my invention what I claim as new and desire to secure by Letters Patent, is:—

1. In a multiple-gang harrow, the combination with front and rear main frames pivotally connected together, and front and rear gang frames pivotally connected with the respective main frames, of a lever pivotally connected between its ends with the front main frame, rods connecting the lower arm of said lever with the front gang frames, a slide carried by the front main frame, connections between the upper arm of said lever and said slide, rods connecting said slide with the rear gang frames, and manually operable means operatively connected with said lever whereby all the gang frames may be angled simultaneously.

2. In a multiple-gang harrow, the combination with front and rear main frames pivotally connected together, and front and rear gang frames pivotally connected with the respective main frame, of a lever pivotally connected between its ends with the front main frame, rods connecting one arm of said lever with the front gang frames, a slide carried by the front main frame, rods connecting said slide with the rear gang frames, rods connected at their rear ends with said slide and adjustably connected at their forward ends with the other arm of said lever whereby the angularity of the rear gang frame may be adjusted relatively to the angularity of the front gang frames, and manually operable means operatively associated with said lever for operating the same.

3. In a multiple-gang harrow, the combination with front and rear main frames, the front frame including a draft tongue, two front gang frames pivotally connected with the front main frame, and two rear gang frames pivotally connected with the rear main frame, of a rear extension secured to the draft tongue, a rear draft bar pivotally connected with said rear extension of the draft tongue, means connecting said draft bar with the rear main frame, a slide on said rear extension, pitmen connecting said slide with the rear gang frames, a lever pivotally connected between its ends with the draft tongue, rods connecting one arm of said lever with the front gang frames, rods connecting the other arm of said lever with said slide, and manually operable means operatively associated with said lever for moving the same to shift all the gang frames simultaneously.

4. In an agricultural implement, the combination with a frame and disk gang members, each pivotally connected with said frame, and operating bars connected with the respective disk gang members for turning the same on their pivotal connections with said frame, of a freely movable rocking bar supported between its ends by the frame and having its respective arms disposed under and freely engaging the said operating bars, whereby the disks at one end of each of said gang members will be prevented from penetrating the ground deeper than the penetration of the disks at the other ends of said gang members without interfering with the flexibility of the gang members to enable them to conform to the contour of the ground.

In testimony whereof I have signed this specification.

WILLIAM D. DEWEND.